Nov. 19, 1940. O. W. BRUCE 2,222,018
RELEASABLE COUPLING
Filed May 4, 1938 2 Sheets-Sheet 1
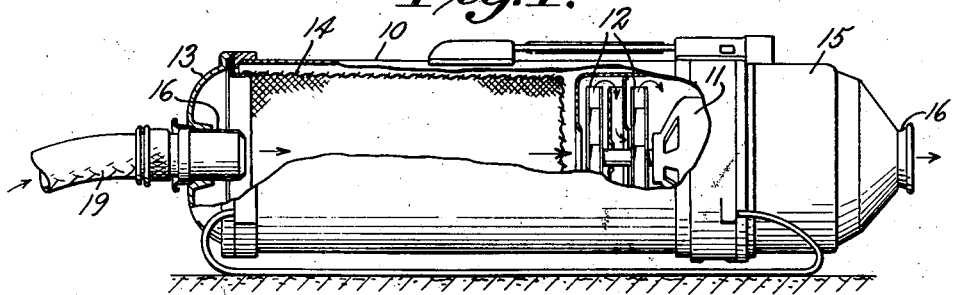
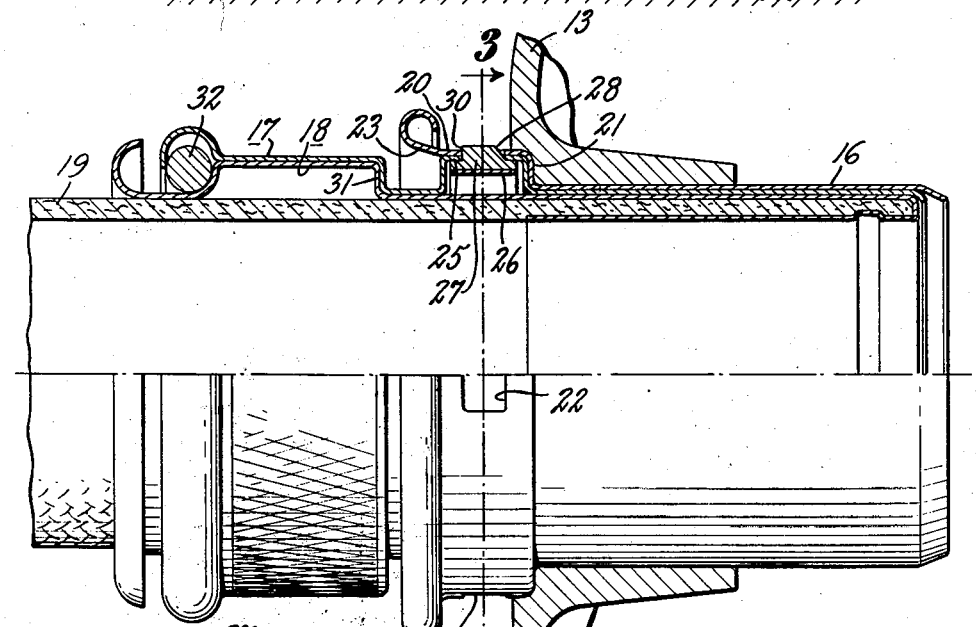
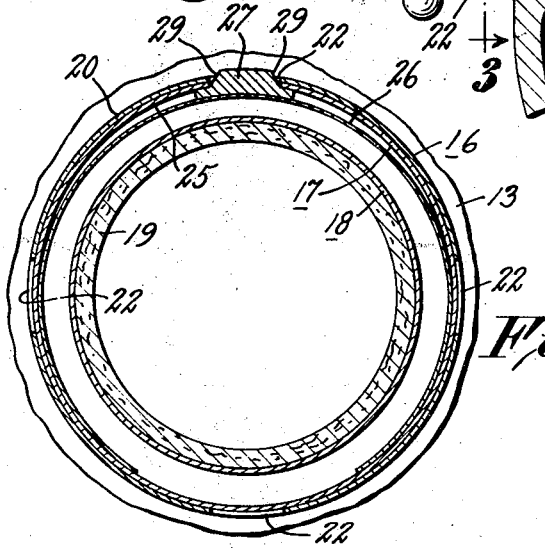
INVENTOR.
Olov Walter Bruce
BY Thomas C. Betts
his ATTORNEY.

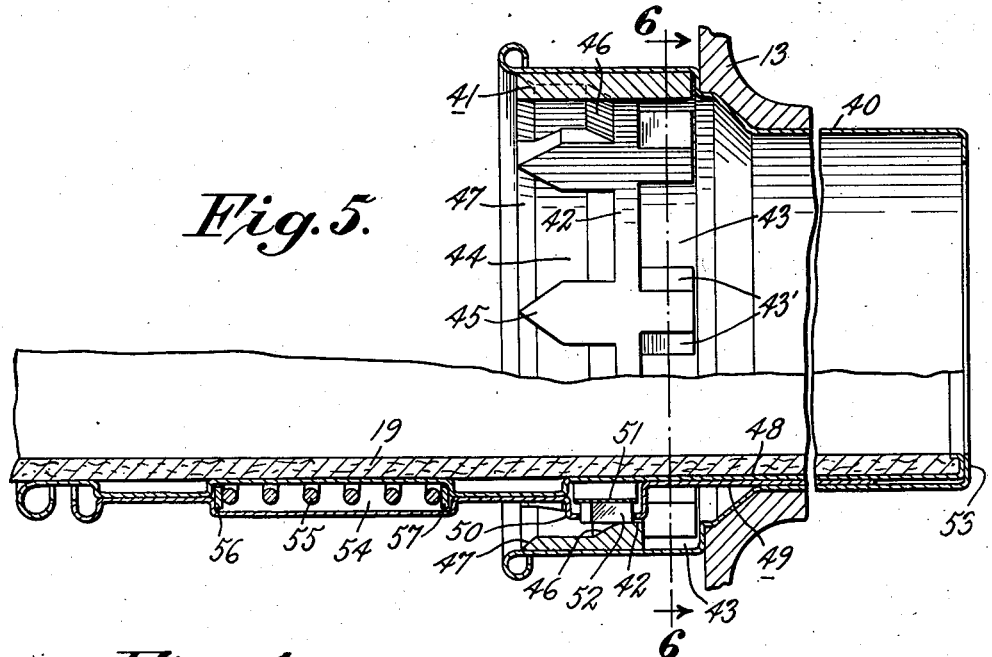
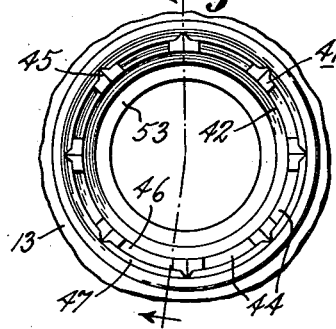
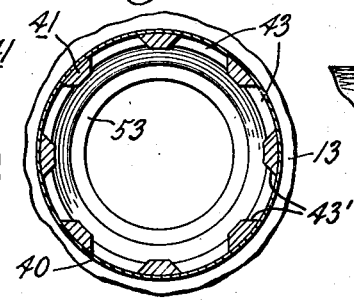
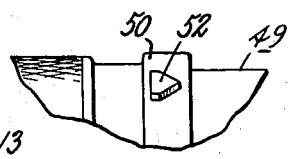
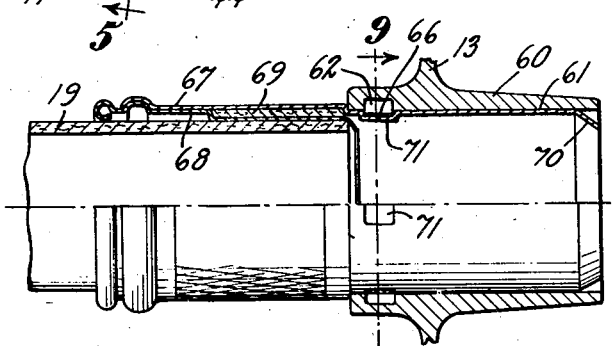
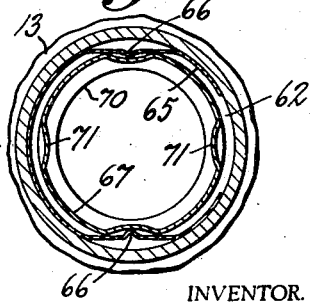

Patented Nov. 19, 1940

2,222,018

UNITED STATES PATENT OFFICE 2,222,018

RELEASABLE COUPLING

Olov Walter Bruce, Stockholm, Sweden, assignor to Electrolux Corporation, Dover, Del., a corporation of Delaware Application May 4, 1938, Serial No. 205,882
In Germany May 5, 1937

2 Claims. (Cl. 285—174)

My invention relates to a releasable hose coupling, particularly adapted for use in connecting fluid conveying conduits, such as are used with vacuum cleaners.

Among the objects of my invention is to provide such a coupling which may be readily engaged and disengaged.

In accordance with my invention the coupling is engaged by merely telescoping the two parts together and is released by merely rotating one of the parts a fraction of a turn relative to the other. If it is desired to provide a coupling which permits relative rotation between the parts while they are coupled together, I mount one of the parts rotatably on the conduit with which it is associated, whereby the conduit may be rotated without releasing the coupling.

Further objects and advantages of my invention will be apparent from the following description considered in connection with the accompanying drawings which form a part of this specification, and of which:

Fig. 1 is a side view, partially in cross-section of a coupling in accordance with one embodiment of my invention incorporated in a vacuum cleaner;

Fig. 2 is a cross-sectional view of the coupling shown in Fig. 1, but on a larger scale;

Fig. 3 is a cross-sectional view taken on the line 3—3 of Fig. 2;

Fig. 4 is an end view of the outer member of another embodiment of my invention;

Fig. 5 is a cross-sectional view taken on the line 5—5 of Fig. 4, but also including the inner member of the coupling;

Fig. 6 is a cross-sectional view taken on the line 6—6 of Fig. 5, the inner member being omitted;

Fig. 7 is a fragmentary view of a portion of the inner member shown in Fig. 5;

Fig. 8 is a cross-sectional view of a third embodiment of my invention; and

Fig. 9 is a cross-sectional view taken on the line 9—9 of Fig. 8.

Referring more particularly to Figs. 1 through 3, reference character 10 designates a vacuum cleaner casing within which is suitably mounted a motor 11 driving a fan 12. An end cap 13 is suitably secured to the inlet end of casing 10 and a dust bag 14 is held in place by means of the end cap. A cap 15 is secured to the other end of the casing. Caps 13 and 15 are formed with preferably cylindrical openings in each of which is mounted a sleeve 16. This sleeve forms the outer part of a coupling. The inner part of the coupling includes a sleeve 17 rotatably mounted upon a sleeve 18 which is fixed in any suitable manner to the end of a conduit 19, this conduit being herein illustrated as a flexible hose.

The outer end of sleeve 16 is formed with a portion 20 of larger diameter which is integral with the remainder of the sleeve by virtue of a shoulder 21. Portion 20 is formed with a plurality of peripherally spaced recesses or openings 22. In the embodiment shown there are four of these openings spaced 90° apart. The outer end of portion 20 is formed with an outwardly flared surface 23.

Sleeve 17 is formed with a portion 25 having an outer diameter substantially equal to the inner diameter of portion 20 of sleeve 16. Portion 25 forms with sleeve 18 an annular space in which is disposed a resilient spring 26. At one point in its circumference, portion 25 is formed with an opening through which there projects a latch member 27. Spring 26 tends to force latch member 27 outwardly through this opening. If desired, two or more latch members could be provided projecting through openings in portion 25 preferably spaced equidistant with respect to the spacing of the openings 22 in sleeve 16. The forward edge of latch member 27 is beveled or inclined as is designated by reference character 28. Likewise, the side edges of the latch member are beveled as designated by reference character 29. However, the rear edge 30 of the latch member is substantially straight.

Sleeves 17 and 18 are formed with cooperating shoulders 31 which prevent relative axial movement of the two sleeves in one direction. A split locking ring 32 prevents relative movement in the other direction, wherefore the sleeves are held against axial movement but are rotatable relative to each other.

The above described coupling operates as follows:

When the two parts are uncoupled, the spring 26 projects the latch member 27 outwardly through the opening in sleeve 17. To couple the parts together, the end of the hose on which the sleeves 17 and 18 are mounted is inserted into the sleeve 16 carried by the cap 13. When the forward beveled edge 28 of the latch member 27 strikes the inclined surface 23 of the sleeve 16, it is forced radially inwardly against the force of spring 26 sufficiently so that it may pass into the cylindrical portion 20. The sleeve 17 is inserted into the sleeve 16 until the portion 25 strikes the shoulder 21. With the parts in this position the latch 27 will be projected into one of the openings 22 in the sleeve 16, provided the latch is in circumferential alignment with an opening. If it is not, it may be brought into alignment by merely rotating the sleeve 17 about the sleeve 18 until the latch engages one of the openings. With the openings spaced 90° from each other, the maximum turning required will be through an angle of less than 90°. If desired, the openings 22 may be spaced closer together.

To release the coupling the outer end of the sleeve 17 is grasped and turned slightly in either direction around the sleeve 18. This causes one of the beveled side edges 29 of the latch member 27 to strike the corresponding side edge of the recess 22 with which the latch has been in engagement, thus forcing the latch radially inwardly against the action of spring 26. When the sleeve 18 has been turned sufficiently to completely disengage the latch from the recess, the coupling is released and the hose may be removed from the cap 13.

The engaging and disengaging of the hose with the opening in the cap 15 is performed in exactly the same manner.

In the embodiment illustrated in Figs. 4 through 7, the opening in the cap 13 is provided with a sleeve 40 having an outer part of larger diameter within which is secured a ring member 41. This ring has a portion 42 of minimum internal diameter. Portion 42 is formed with a plurality of circumferentially spaced recesses 43, the side edges of which are beveled as is shown at 43' in Fig. 6. Axially outwardly from portion 42 and in alignment with recesses 43, the ring 41 is formed with a plurality of peripherally spaced spaces 44 separated by pointed guiding means 45. The inner edges of spaces 44 are formed with inclined or beveled surfaces 46, and the outer edge of the ring 41 is beveled in alignment with spaces 44, as is shown at 47. A sleeve 48, corresponding to sleeve 18 in Fig. 2 is fixed to the end of hose 19. Slidably and rotatably mounted on sleeve 48 is an outer sleeve 49 formed with a portion of increased diameter 50 within which is a spring 51, similar to spring 26 in Figs. 2 and 3. Spring 51 serves to force a latch member 52 outwardly through an opening formed in portion 50 of sleeve 49. The forward edge of latch 52 is pointed, as shown more clearly in Fig. 7. Sleeve 40 is formed with an inwardly extending flange 53 which limits inward telescoping movement of hose 19 and sleeve 48. Sleeves 48 and 49 are so shaped as to form therebetween an annular space 54 in which is received a coil spring 55. This spring, acting through washers 56 and 57, tends to retain the sleeves 48 and 49 in the relative axial positions shown in Fig. 5, but permits axial displacement of one sleeve relative to the other against the force exerted by the spring.

In order to couple the parts together, the hose 19 and sleeves 48 and 49 are inserted within sleeve 40 until the end of sleeve 48 strikes flange 53, the inclined surfaces 47 and 46 pressing latch 52 radially inwardly. If the latch member 52 was not initially in alignment with the center of one of the spaces 44 the pointed guide members 45 cooperating with the pointed end of the latch member serve to rotate the sleeve 49 until the desired alignment is obtained. Consequently, the latch 52 is then in alignment with one of the recesses 43. To complete the coupling operation after the parts are in the position shown in Fig. 5, the sleeve 49 is moved axially against the force of spring 55 until the latch 52 is in axial alignment with one of the recesses 43, whereupon the spring 51 forces the latch into this recess, thus coupling the parts together.

In order to release the coupling, the sleeve 49 is rotated slightly in either direction, the beveled side edges 43' of the recesses 43 serving to force the latch 52 inwardly against the force of spring 51 and hence out of engagement with the recess. As soon as the latch is disengaged from the recess, spring 55 forces sleeve 49 and latch 52 to the left, as shown in Fig. 5, whereby continued rotation of the sleeve and latch does not cause the sleeve to engage in the next recess 43. Thus, it is not necessary for the operator to pull the sleeve 49 outwardly at the same time he rotates it. It will thus be seen that spring 55 is not necessary, but it does serve to make the coupling somewhat easier to manipulate.

In the embodiment shown in Figs. 8 and 9, the end cap 13 is formed with a portion 60 having a cylindrical bore 61. Near the outer end of the bore there is formed an annular groove 62 in which is received a spring 65, the shape of which is well shown in Fig. 9. As will be seen, this spring has radially inwardly projecting portions 66, which portions, when the spring is unstressed, extend into the bore 61.

A sleeve 67 is rotatably mounted on a sleeve 68 fixed to the end of the hose 19. If desired, packing 69 may be placed in an annular space between the sleeves 67 and 68. The end of sleeve 67 is formed with a conical portion 70. At spaced points around the circumference of sleeve 67, and in axial alignment with the projections 66 when the parts are coupled, the sleeve is formed with recesses 71 which are adapted to be engaged by the projections 66. As will be seen from Fig. 9, the bottoms of recesses 71 are curved, while their forward and rear bounding surfaces are straight.

In order to connect the coupling, the end of sleeve 67 is inserted into bore 61. The conical portion 70 serves to force the projections 66 of spring 65 radially outwardly when it strikes them, thereby permitting the sleeve to pass these projections. When the sleeve 67 has been inserted all the way into bore 61, it is turned until the projections 66 are in alignment with recesses 71. Thereupon, the resiliency of spring 65 forces the projection 66 into the recesses and the parts are held in coupled relationship. To release the coupling, the sleeve 67 is rotated, whereupon the curved bottoms of recesses 71 force the projections 66 radially outwardly and out of engagement with the recess, thereupon the sleeve 67 may be removed from the bore 61.

It will be seen that in each of the embodiments, coupling of the parts is effected by telescoping them together. In the embodiments illustrated in Figs. 1 through 3 and Figs. 8 through 9, a slight relative rotation of the parts may be necessary to engage the coupling. However, in the embodiment illustrated in Figs. 4 through 7, guiding means are provided for rotating the parts into proper alignment. In all modifications the coupling is released by merely rotating the parts relative to each other through a small angle.

While I have shown three more or less specific embodiments of my invention it is to be understood that this has been done for purposes of illustration only and that the scope of my invention is not to be limited thereby, but is to be determined by the appended claims viewed in the light of the prior art.

What I claim is:

1. In a releasable conduit coupling including telescoping parts adapted to be coupled together, a movable latch member carried by one of said parts, the other of said parts being formed with a recess for engaging said latch to retain the parts coupled together, resilient means tending to move said latch into engagement with said recess, means operative by relative telescoping movement of said parts in one direction to displace said latch against the force of said resilient means into a radial position to engage said recess, and means on said other of said parts to guide said latch circumferentially into alignment with said recess.

2. In a releasable conduit coupling including telescoping parts adapted to be coupled together, a movable latch member carried by the inner of said parts and circumferentially spaced therearound, resilient means for urging said latch outwardly, the outer of said parts being formed with circumferentially spaced recesses for engaging said latch to retain the parts coupled together, means operative by the telescoping together of said parts to displace said latch member inwardly against the force of said resilient means, and guiding means between the recesses in said outer part for guiding said latch circumferentially into alignment with one of said recesses.

OLOV WALTER BRUCE.